May 13, 1947.   B. S. T. BISHOP ET AL   2,420,296
WORK CONTROL MECHANISM FOR MACHINE TOOLS
Filed June 8, 1944   4 Sheets-Sheet 1
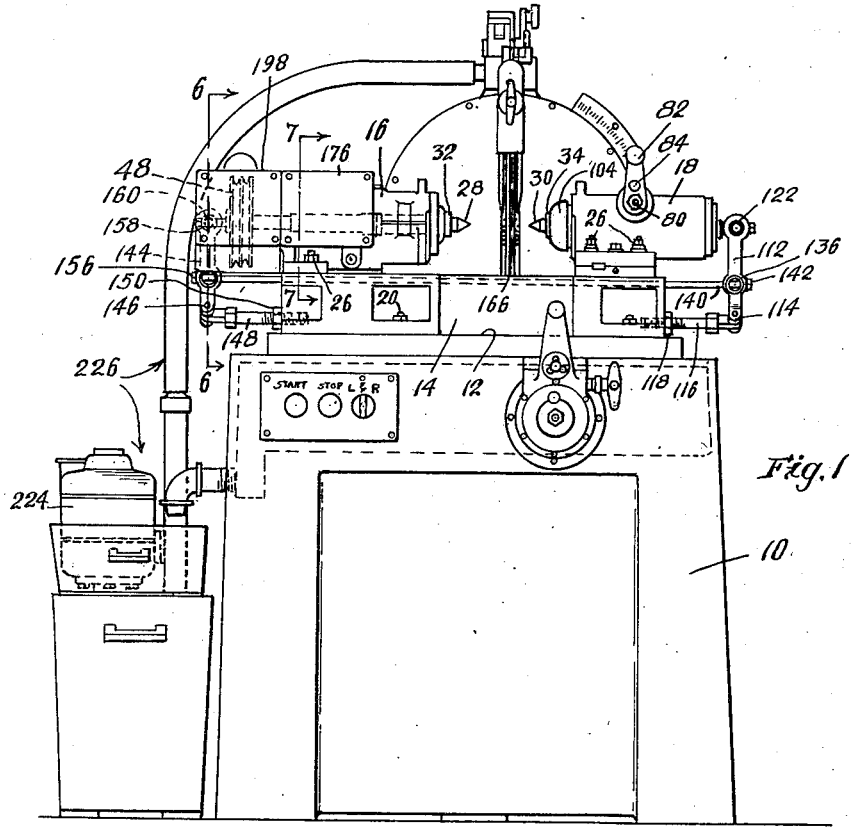
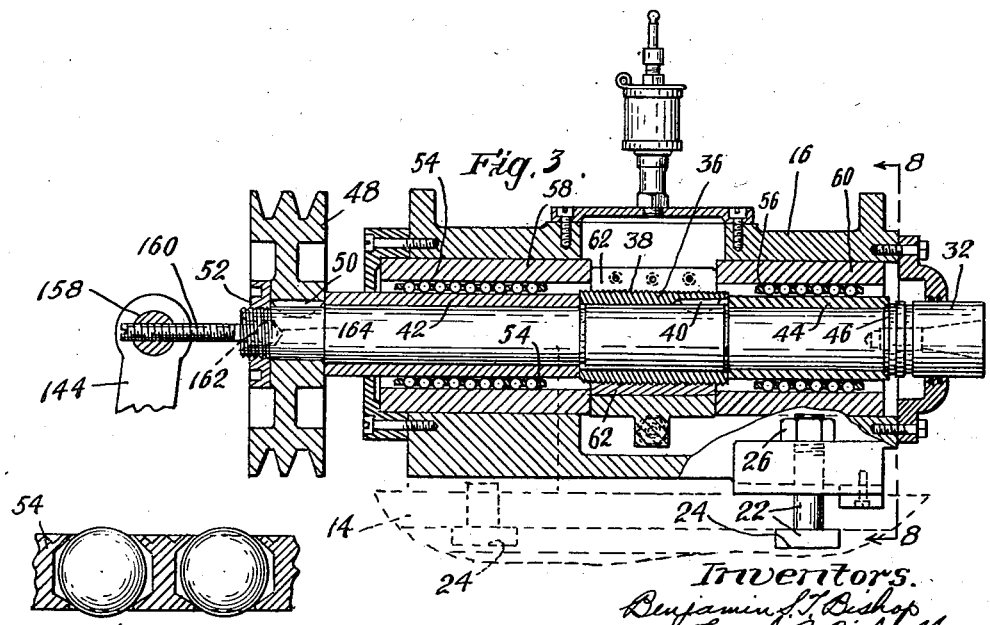

May 13, 1947. B. S. T. BISHOP ET AL 2,420,296
WORK CONTROL MECHANISM FOR MACHINE TOOLS
Filed June 8, 1944 4 Sheets-Sheet 3
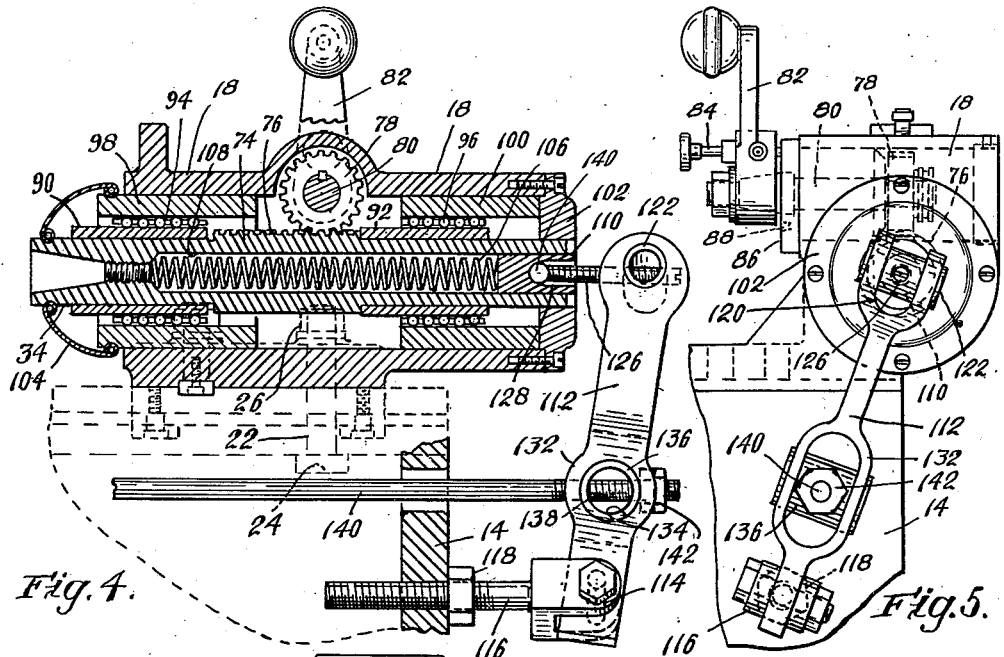
Fig. 4.
Fig. 5.
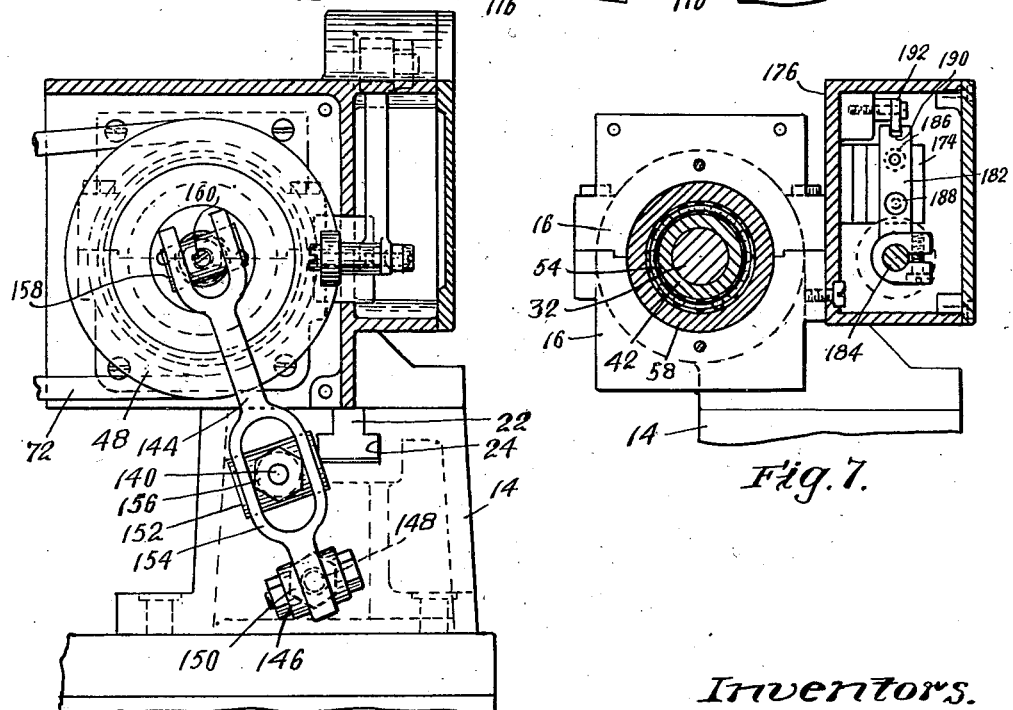
Fig. 6.
Fig. 7.
Inventors.
Benjamin S. T. Bishop
Frank A. Bicknell
By their Atty.
John H. McKenna May 13, 1947.  B. S. T. BISHOP ET AL  2,420,296
WORK CONTROL MECHANISM FOR MACHINE TOOLS
Filed June 8, 1944  4 Sheets-Sheet 4

Inventors.
Benjamin S. T. Bishop
Frank R. Bicknell
John H. McKenna
By their Attorney Patented May 13, 1947

2,420,296

UNITED STATES PATENT OFFICE 2,420,296

WORK CONTROL MECHANISM FOR MACHINE TOOLS

Benjamin S. T. Bishop, Shrewsbury, and Frank A. Bicknell, Worcester, Mass., assignors to Leland-Gifford Company, Worcester, Mass., a corporation of Massachusetts Application June 8, 1944, Serial No. 539,356

2 Claims. (Cl. 51—95)

This invention relates to improvements in machine tools of the general class wherein the work is held between headstock and tailstock centers and is rotated while being fed past a cutting or other tool which is to perform a particular operation upon the work at a predetermined location at which the tool can be adjusted into and out of operative relation to the work.

Our invention is herein illustrated and described in connection with a thread grinding machine, but it should be understood that the novel features disclosed are applicable to machine tools of various descriptions wherein the work is held between centers and moved axially past a tool.

Machine tools of the mentioned general class require interconnection of the headstock and tailstock spindles so that the spindles, and the workholding centers therein, can move in unison as the work is being fed past the tool.

It is among the objects of our present invention to provide improved means for ensuring unitary axial travel of the head and tail stock spindles and ensuring also an approximate uniformity of axial pressure upon the work between centers throughout the complete range of travel of the work relative to the cutting wheel or other tool, and upon each of successive similar work pieces inserted between the centers. We employ a construction in which the head and tail stock spindles move axially within their respective stocks when feeding the work past the cutting wheel, and in which the interconnection between the spindles is a cushioned interconnection which is adjustable to provide a suitable axial pressure on the work and which automatically maintains that pressure uniform.

Another object of our invention is to embody within the headstock the means for axial movement of the spindles, and to provide a flexible drive for rotating the headstock spindle which permits axial travel of the spindle while the source of power continues relatively stationary. A screw on the headstock spindle, coacting with a nut fixed interiorly of the headstock, causes axial movement of the spindle when the spindle is rotated, and a V-belt drive connection between the spindle and the power source permits this axial travel of the spindle while the power source, such as a reversible electric motor, remains fixed in position.

Another object of our invention is to provide means for automatically stopping the work-driving motor at each predetermined limit of axial travel of the work holding spindles, to the right and to the left. A pair of spaced apart micro- switches are controlled by movements of the headstock spindle so that, at a predetermined limit of travel of the spindle to the right, one micro-switch in the motor circuit is opened, and, at a predetermined limit of travel of the spindle to the left, the other micro-switch in the motor circuit is opened. By providing so that each micro-switch is reclosed shortly after the means which opened it moves away, a manual three-position switch having a "left" position, a central "off" position, and a "right" position can control the work-driving electrical system.

Still another object of our invention is to provide means whereby the tailstock spindle, when engaging a piece of work, is free to be moved manually away from the work for removal of the work, and automatically engages a newly inserted work piece with the predetermined pressure thereon, when released from a manually retracted position. The previously mentioned cushioned interconnection between spindles permits manual resilient retraction of the tailstock spindle without movement of the headstock spindle, and the tailstock spindle, when released, is moved back into engagement with a work piece by the resilience of a backing spring or the like in the said interconnection.

A further object of our invention resides in the ball bearing mounting structure for the headstock and tailstock spindles, whereby they are axially and rotatably movable within their stocks.

It is, moreover, our purpose and object generally to improve the structure and operation of thread grinding machines.

In the accompanying drawings:

Figure 1 is a front elevation of a thread grinding machine embodying features of our invention;

Figure 3 is a vertical medial sectional view of the headstock, on a larger scale;

Figure 4 is a vertical medial sectional view of the tailstock on the same scale as Figure 3;

Figure 5 is an end elevation of the tailstock, looking from the right in Figure 4;

Figure 6 is a sectional view on line 6—6 of Figure 1;

Figure 7 is a sectional view on line 7—7 of Figure 1;

Figure 9 is a fragmentary sectional view of one of the ball bearing units employed in both headstock and tailstock;

Figure 2:
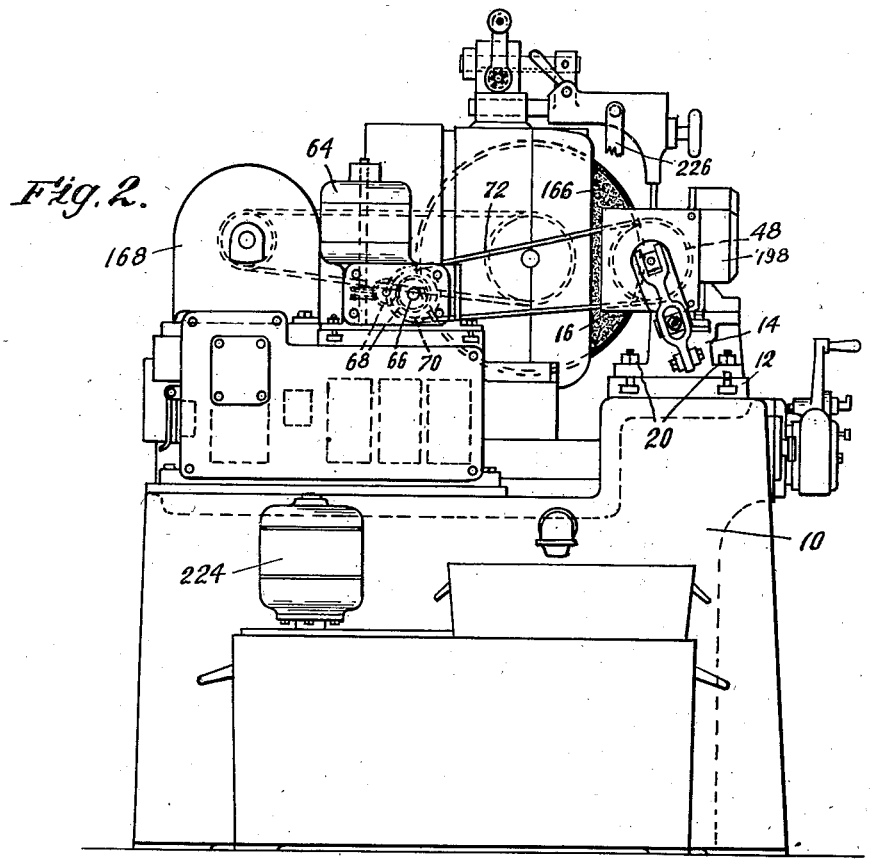
Figure 2 is an end elevation looking from the left in Figure 1.

Referring to the drawings, the machine bed 10 is formed at its forward top portion with a longitudinally extending plane horizontal surface 12 on which is secured the base member 14 for supporting both the headstock 16 and the tailstock 18. The base member may be secured on surface 12 in any suitable manner as by the bolts 20. The headstock 16 and tailstock 18 are secured in longitudinally adjustable relation on the base member 14, as by the T-bolts 22 engaging a T-slot 24 in the base member and retained by the nuts 26 on the ends of the T-bolts. The headstock 16 and tailstock 18 remain fixed in position after they have been adjusted and secured on base member 14 for any particular work-threading operation.

The work (not shown) is held between the centers 28, 30, respectively, in the headstock spindle 32 and the tailstock spindle 34, and is rotated by its engagement with the driven headstock center 28.

According to our present invention, the headstock spindle 32 has secured thereon, within the headstock, an exteriorly screw-threaded sleeve 36 whose threads 38 are the same as the threads to be cut in the work. As best seen in Fig. 3, this master-thread sleeve 36 may be keyed to spindle 32 as at 40, and is shown engaged endwise between the two spindle bearing bushings 42, 44, which in turn are clamped endwise between a shoulder 46 on spindle 32 and a pulley 48 keyed as at 50 to the outer end of the spindle, and pressed against the end of bushing 42 by nut 52 which is screw-threaded on the extreme outer end of the spindle. Ball bearings 54, 56 intervene between the spindle bushings 42, 44 and the headstock bushings 58, 60, which latter bushings 58, 60 have interior diameter permitting longitudinal movement of the threaded sleeve 36 therein. Hence the headstock spindle unit, comprising the spindle 32, sleeve 36, bushings 42, 44, pulley 48 and center 28, can move in axial directions and does so move when the unit is rotated, due to coaction of the threaded sleeve 36 with a nut 62 fixed interiorly of the headstock.

The particular master-thread sleeve 36 herein represented is designed for use in cutting the threads on tappet valves of aircraft engines. Sleeves with different threads and corresponding nuts are interchangeable for the sleeve 36 and nut 62.

Rotation of the spindle unit, at a suitably slow speed, is accomplished by a reversible electric motor 64 which drives a shaft 66 through suitable reduction gears 68. A pulley 70 on shaft 66 has a V-belt 72 connecting it with the spindle pulley 48. The V-belt engaging in corresponding peripheral grooves in the pulleys, permits the pulley 48 to move axially with the spindle the required amount in each direction without breaking the drive connection and while the motor 64, shaft 66 and pulley 70 remain relatively fixed in positions.

The tailstock spindle 34 is shown in detail in Fig. 4. It has a portion 74 of enlarged diameter whose upper part is formed as a gear rack 76 for coacting with a spur gear 78 which rotates with a short shaft 80 mounted transversely of the tailstock. Shaft 80 extends out through the front wall of the tailstock and has on its outer end a handle 82 by which the gear may be manually rotated to move the spindle axially in direction away from the work. As represented, a spring pressed finger pin 84 rides on a plane surface 86 of the tailstock as the handle rotates. One or more holes 88 in said plane surface may be provided in which said pin may engage, to maintain the spindle temporarily in a particular position.

Referring to Fig. 4, the tailstock spindle 34 has the bushings 90, 92 press-fitted or otherwise mounted thereon, on opposite sides of the enlarged portion 74, and ball bearing units 94, 96 intervene between these bushings 90, 92 and tailstock bushings 98, 100 which latter are mounted fixedly within the tailstock. Preferably, the exterior diameter of the spindle bushings 90, 92 will be at least equal to the external diameter of the enlarged portion 74 of the spindle so that this enlarged portion can pass through the ring of ball bearings 96 to permit insertion and removal of the spindle when the end cap 102 is removed.

The inner-center-carrying end of tailstock spindle 34 may be connected to the tailstock by a protective flexible cover or boot 104, of leather or the like, to keep metal chips and other foreign matter from interfering with the free sliding movement of the spindle.

The axial position of spindle 34 in the tailstock is determined by the position of spindle 32 in the headstock, through a flexible interconnection between them. As represented in Fig. 4, a long coil spring 106 is housed within an axial bore 108 in the tailstock spindle 34, seating at its inner end on the bottom of the bore and engaging, at its outer end, a plug or piston 110 which is slidable in the bore 108 and which is controlled as to position by a lever 112.

The lever 112 has its lower end pivotally mounted at 114 on the outer end of a pin or stud 116 which is adjustably fixed on the base member 14 as by being threaded into the base member and locked by the lock nut 118.

The upper free end of lever 112 is bifurcated as at 120 (Fig. 5), and a relatively short large diameter pin 122 is rotatably mounted in aligned openings 124, extending across the space between the spaced end portions of the lever. This short large diameter pin 122 has screwed therein a relatively long smaller diameter pin 126 whose inner end projects into an axial cavity 128 in the plug or piston 110, with its end bearing on a ball 140 in the bottom of the cavity. Hence the lever 112 may be swung in one direction about its pivot 114 thereby to force the plug or piston 110 inward for applying pressure to spring 106 and through it to the spindle 34, and may be swung in the opposite direction to relieve the spring and spindle of lever pressure.

Intermediate its ends, the lever 112 is formed with a yoke portion 132, the side walls of which have aligned openings 134 for mounting rotatably a large diameter pin 136, similar to the pin 122. This pin 136 has a transverse hole 138 loosely receiving the threaded end of a connecting rod 140, and nuts 142 on the outer end of the rod maintain the rod against pulling out of pin 136 and also permit adjustment of the effective length of the rod between lever 112 and a similar lever 144 to which the opposite end of the rod is connected at the headstock end of the machine.

Referring to Fig. 1, the connecting rod 140 is a straight and stiff rod extending loosely through the base member 14. Its connection to lever 144 is similar to its connection at the opposite end to lever 112, lever 144 being pivoted at 146 on the outer end of a pin, or stud, 148 which is threaded into base member 14 and adjustable therein by the lock nut 150. The connecting rod extends loosely through a large diameter pin 152 rotatably mounted at the yoke part 154 of the lever, with a nut 156 screwed on the outer end of the connecting rod to prevent its pulling out of pin 152.

Lever 144, like lever 112, is bifurcated at its free end for rotatably mounting the large diameter pin 158 in which a long smaller diameter pin 160 is threaded with its inner end engaging a ball 162 in the bottom of a cavity 164 formed in the end of the headstock spindle 32.

Hence, by adjusting the nut 156 at the headstock end of the connecting rod 140, or the nuts 142 at the tailstock end, the lever 112 may be drawn inward against the resiliency of spring 106, or may be permitted to be moved outward by the spring accordingly as the effective length of the connecting rod is shortened or lengthened by such adjustment.

Threads are cut in the work held between the centers 28, 30 by a grinding wheel 166 which is belt driven by an electric motor 168. The wheel 166 may be moved into and out of thread grinding relation to the work by any suitable means such as is disclosed and claimed in our copending application for patent Serial No. 539,357, filed June 8, 1944.

In operation, assuming that the work is a valve tappet whose exterior surface is to be threaded, the headstock and tailstock will be suitably spaced apart and fixed in positions on the base member 14. Assuming the spindles to be at the limit of their travel to the left, a movement of the tailstock handle 82 counter-clockwise will retract the tailstock spindle 34 to enable the insertion of a valve tappet between the centers 28, 30, after which release of handle 82 will result in movement of spindle 34 into engagement with the work, under the influence of spring 106, and the pressure exerted axially on the work will be a proper pressure predetermined by adjustment of the effective length of the connecting rod 140.

The grinding wheel 166 may be continuously rotating while the work is being inserted and removed from the machine but will be backed away from thread cutting position at such times. When the valve tappet, or other piece of work, has been engaged between the centers 28, 30, the wheel 166 will be advanced to thread-cutting position. Then the switch 170 at the front of the machine will be turned clockwise to its "R" position to start motor 64 operating in direction to move the spindles 32, 34 and the work held between their centers to the right, through the medium of the threaded sleeve 36 on the headstock spindle, coacting with the fixed nut 42 in the headstock. The V-belt spindle drive permits the spindle pulley 48 to move with the spindle the needed amount.

When the rotating tappet has moved axially an amount sufficient to have threads cut along a predetermined extent thereof, the spindle driving motor 64 automatically stops. By employing a suitably over-long threaded sleeve 36 in the headstock, the work may be removed and a new piece inserted at this limit of movement to the right, precisely as described at the other limit. However, the illustrated machine is designed to make a rough cut on its movement to the right and a finish cut as the same work piece moves back to its left hand limit of travel. Hence, at the right hand limit, the operator merely moves the wheel forward for the finish cut and turns switch 170 to its "L" position. When the threaded work piece comes to rest at its left hand limit of travel, the grinding wheel will be backed away as before, and handle 82 manually rotated counter-clockwise to release the threaded piece and to permit insertion of an unfinished piece in line with the centers, after which the handle 82 is released and spring 106 presses the spindle 34 inward until its center 30 engages the work with the predetermined axial pressure. Wheel 166 is next moved forward to its position for a rough cut, after which switch 170 is turned clockwise to its "R" position to start motor 64 operating in direction to move the work to the right past the grinding wheel.

The automatic stopping of motor 64 to limit travel of the work to right and to left is accomplished by a pair of micro switches 172, 174 mounted in a casing 176 on the front of the headstock 16. The switches are suitably spaced apart in direction of travel of the spindles, and each switch has an actuator 178, 180 projecting toward the other switch. An arm 182 is mounted within casing 176 between the switches 172, 174, it being secured on a slidable rod 184. Oppositely disposed screws 186, 188 are adjustable in the arm 182 and are aligned respectively with the actuator 178, 180, so that, when the arm 182 moves to the right, screw 186 engages the actuator 178 to open the motor circuit and, when the arm 182 moves to the left, screw 188 similarly engages actuator 180 to open the motor circuit.

As represented, the arm 182 has its end which is remote from rod 184 grooved as at 190 for riding on a guide plate 192.

Movement of arm 182 to right and left is accomplished by the pulley 48 as it moves with the headstock spindle 32. A lever 194 depends from a pivot 196 within the casing 198 at the front of the headstock, and the lever carries a pair of rollers 200, 202 disposed on opposite sides of the pulley 48. A link connection 204 between lever 194 and rod 184 causes sliding movement of the rod when lever 194 swings about its pivot 196 as a result of engagement of pulley 48 with one or the other of rollers 200, 202. Hence, when pulley 48 moves to the right, rod 184 is moved to the right until screw 186 engages actuator 178 to stop motor 64. Similarly, the rod moves to the left when the pulley so moves, until screw 188 engages actuator 180 to stop the motor. However, each actuator 178, 180 moves out to its original closed circuit position as soon as the screw 186 or 188 moves away, thereby conditioning the system for manual control at the switch 170 at the front of the machine. The electrical system controlled by the micro switches 172, 174 and the manual switch 170 is shown diagrammatically in Fig. 12.

Figure 12:
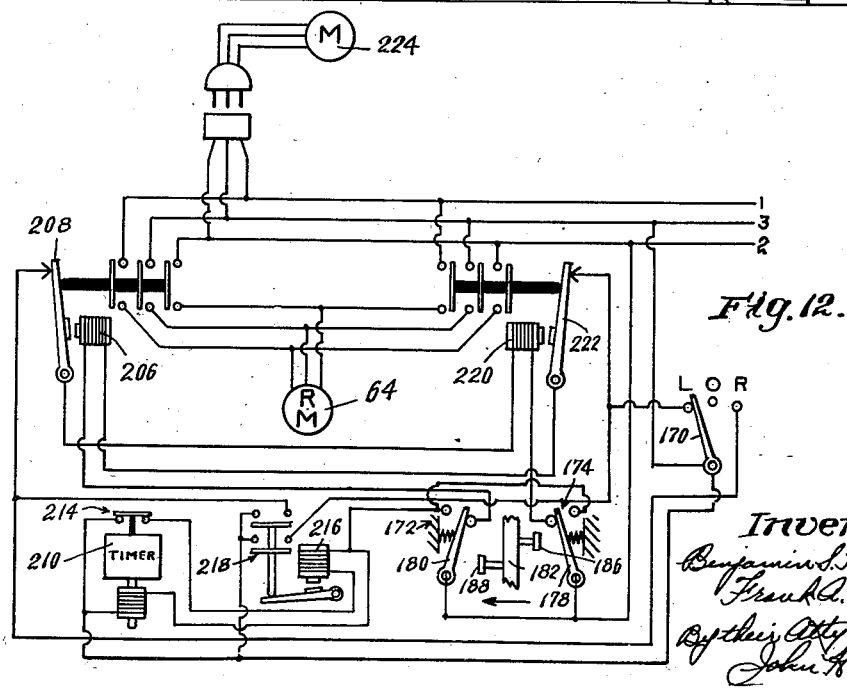
Figure 12 is a diagrammatic representation of the electrical connections.
Figure 10:
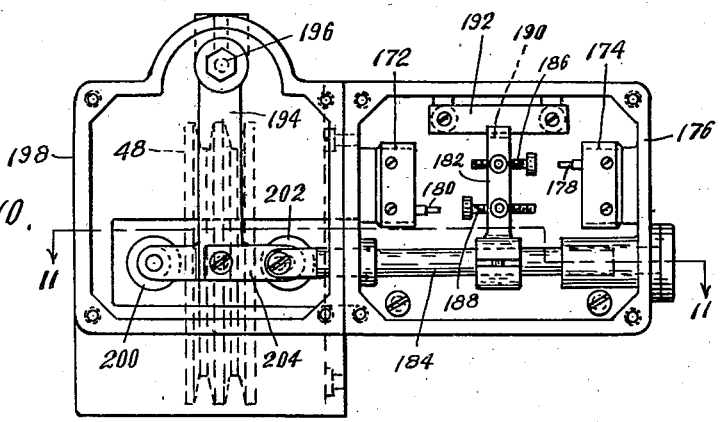
Figure 10 is a front elevation looking into the micro-switch casings, the front covers being removed.
Figure 11:
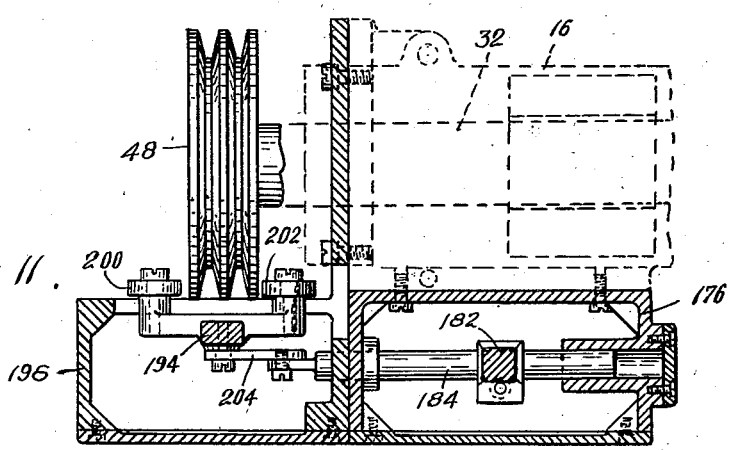
Figure 11 is a sectional view on line 11—11 of Figure 10.
Figure 8:
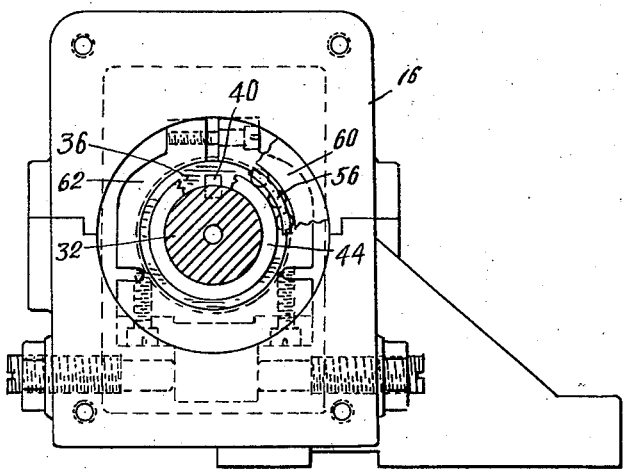
Figure 8 is a sectional view on line 8—8 of Figure 3.

Referring now to Fig. 12, the manual switch 170 is shown in its "L" position closing lines 2 and 3 through the solenoid 206 whose energization will attract switch arm 208 and close the three phase circuit to reversible motor 64 by operation of the gang of switches at the left of the motor. Hence the motor will operate in direction to move the work from right to left until arm 182 moves sufficiently to the left for its screw 188 to engage actuator 180 of micro-switch 172 and open the circuit through solenoid 206. Immediately switch arm 208 moves to the left permitting its associated gang of switches to open the motor circuit. However, the momentum of the rotor of the motor might cause over-running of the work unless counter-acted. Hence provision is made for momentarily reversing the current through the motor for braking the rotor. The reversal of the current does not persist long enough to actually reverse the travel of the rotor but has the effect of stopping the rotor almost instantaneously. This result is accomplished by means of a timer 210 controlling a normally closed switch 214 in a circuit through a solenoid 216 which circuit is normally open at the microswitch actuator 180. When, however, the actuator 180 is actuated to open the operating motor circuit, it closes the circuit through solenoid 216 whose energization results in closing the switch unit 218 thereby to energize the solenoid 220 at the right of motor 64. Switch arm 222 is attracted by solenoid 220 to the right thereby closing the associated gang of switches and closing the reversing circuit through the motor. Timer 210, however, may be set to operate on three to five cycles and opens its switch 214 to open the reversing circuit before actual reversal of the motor 64 occurs. The action is similar when arm 182 moves to the right and opens actuator 178 of micro-switch 174. Movement to the right will be preceded by a shifting of switch 170 to its "R" position thereby to cause energization of the solenoid 220. A motor 224 of a coolant distributing system 226 may be plugged into the regular motor circuit at will.

We claim as our invention:

1. In a machine tool, a headstock spindle and a tailstock spindle, said spindles having centers between which the work is held, means mounting said spindles for movement in axial directions, means associated with the headstock spindle constraining it against axial movement, resilient means urging the tailstock spindle axially toward the headstock spindle, said resilient means including a pair of pivoted levers respectively at the outer end of the headstock spindle and at the outer end of the tailstock spindle, the headstock lever engaging the outer end of the headstock spindle and there being a spring intervening between the tailstock lever and the tailstock spindle, said levers having a connecting rod preventing relative spreading apart of the levers and permitting relative movement of said levers toward each other, and means on the connecting rod for adjusting its effective length between the levers.

2. In a machine tool, a headstock spindle and a tailstock spindle, said spindles having centers between which the work is held, means mounting said spindles for movement in axial directions, means associated with the headstock spindle constraining it against axial movement, resilient means urging the tailstock spindle axially toward the headstock spindle, said resilient means including a pair of pivoted levers respectively at the outer end of the headstock spindle and at the outer end of the tailstock spindle, the headstock lever engaging the outer end of the headstock spindle and there being a spring intervening between the tailstock lever and the tailstock spindle, said levers having a connecting rod preventing relative spreading apart of the levers and permitting relative movement of said levers toward each other, and means for adjusting the tension of said spring between the tailstock lever and the tailstock spindle, thereby to vary the spring pressure tending to move the tailstock spindle toward the headstock spindle.

BENJAMIN S. T. BISHOP.
FRANK A. BICKNELL.

REFERENCES CITED

The following references are of record in the file of this patent:

UNITED STATES PATENTS

| Number | Name | Date |
|---|---|---|
| 2,311,815 | Briney | Feb. 23, 1943 |
| 2,317,226 | Seyferth | Apr. 20, 1943 |
| 2,347,766 | Briney | May 2, 1944 |
| 1,367,523 | Bernard | Feb. 1, 1921 |
| 1,528,188 | Frost | Mar. 3, 1925 |